United States Patent [19]

Sygnator

[11] Patent Number: 4,749,319
[45] Date of Patent: Jun. 7, 1988

[54] ANTI-STRIPPING SHEET METAL SCREW

[75] Inventor: Henry A. Sygnator, Arlington Heights, Ill.

[73] Assignee: Illinois Tool Works Inc., Chicago, Ill.

[21] Appl. No.: 932,344

[22] Filed: Nov. 19, 1986

[51] Int. Cl.4 .......................... F16B 5/02; F16B 39/30
[52] U.S. Cl. .................................... 411/188; 411/311; 411/399; 411/412
[58] Field of Search ............... 411/399, 184–189, 411/311, 116–118, 131–135, 145, 146, 173, 174, 176, 160–166, 180, 369, 308, 309, 378, 394, 398, 386, 411–416

[56] References Cited

U.S. PATENT DOCUMENTS

| | | | |
|---|---|---|---|
| D. 31,749 | 10/1899 | North | 411/411 X |
| 1,238,636 | 8/1917 | Christofferson | 411/399 |
| 1,953,305 | 4/1934 | MacLean | 411/399 |
| 2,037,586 | 4/1936 | Olson | 411/188 |
| 2,096,040 | 10/1937 | Hosking | 411/187 |
| 2,169,408 | 8/1939 | De Vellier | 411/399 X |
| 3,812,639 | 5/1974 | Sygnator | 411/311 X |
| 4,490,082 | 12/1984 | Barth | 411/188 X |
| 4,516,893 | 5/1985 | Barth | 411/399 X |
| 4,518,294 | 5/1985 | Barth | 411/311 X |

FOREIGN PATENT DOCUMENTS 1040322  10/1958  Fed. Rep. of Germany ...... 411/378

Primary Examiner—Lloyd A. Gall
Attorney, Agent, or Firm—D. I. Roche; T. W. Buckman

[57] ABSTRACT

A sheet metal screw is disclosed having an enlargement in the form of a helical ramp on the shank adjacent the head, which ramp extends for only about 180 degrees for providing an interfering fit with a workpiece to obtain an anti-stripping action while permitting the screw to provide an effective clamping action.

5 Claims, 2 Drawing Sheets

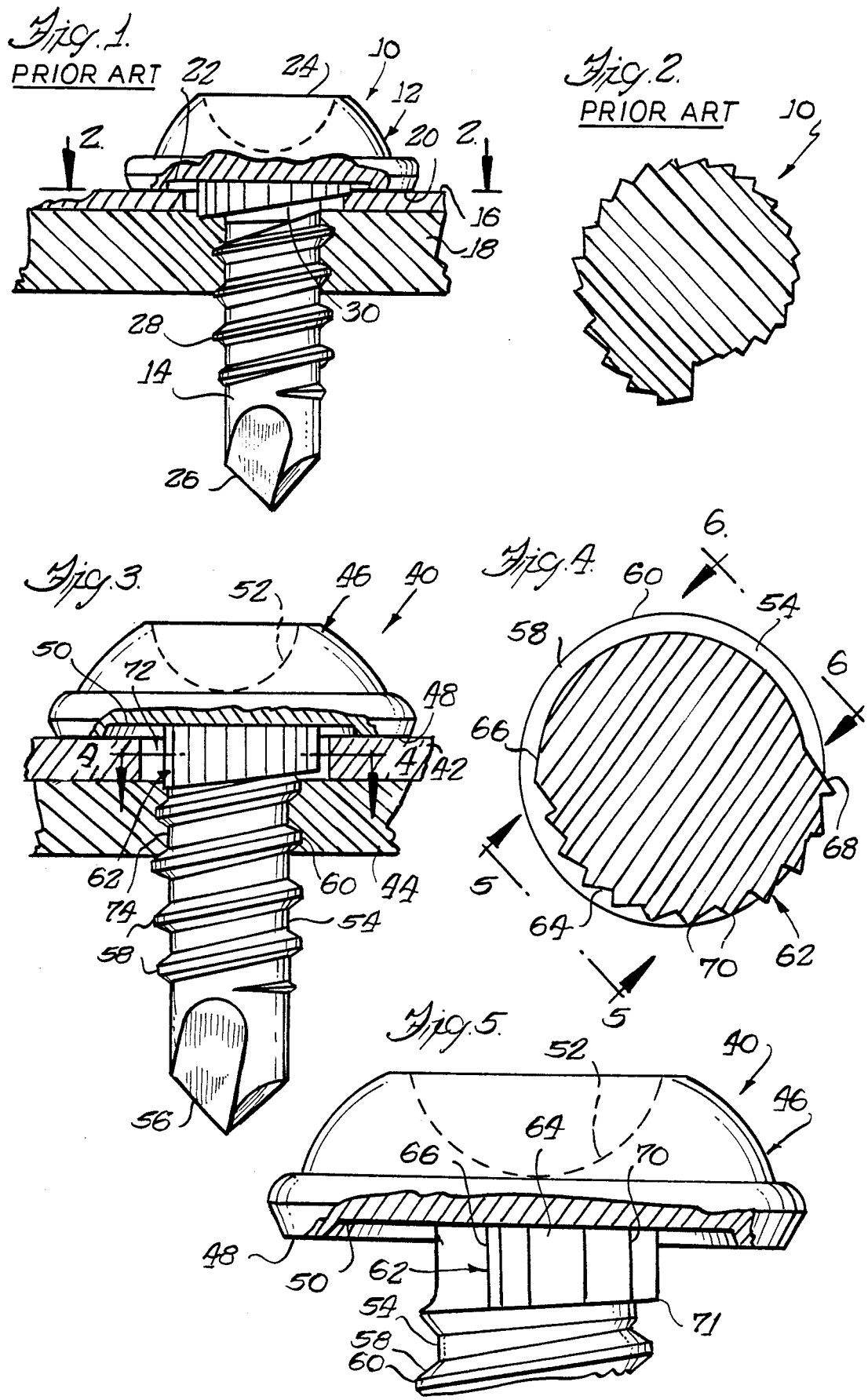

ANTI-STRIPPING SHEET METAL SCREW

BACKGROUND OF THE INVENTION

The present invention relates to a novel screw, and more particularly to a novel screw particularly suitable for use with sheet metal.

When securing sheet metal members together with screws, difficulty has frequently been encountered in providing sufficient driving torque to obtain the desired clamping power without stripping the screw from the thin sheet metal parts. A substantial advance in overcoming or minimizing this problem is disclosed in U.S. Pat. No. 4,516,893. The present invention contemplates a novel structure which further enhances the functionability of the screw and also facilitates easier and more economical production as compared with the screw of the aforementioned patent.

SUMMARY OF THE INVENTION

It is an important object of the present invention to provide a novel anti-stripping sheet metal screw having improved tightening effectiveness or clamping power.

It is a further object of the present invention to provide a novel anti-stripping sheet metal screw of the above-described type which is constructed so that it may be more simply and economically produced and more specifically so that dies used in the manufacture thereof may be simpler and longer lasting.

In accordance with the present invention, a sheet metal screw is provided having a shank with conventional threads and a head of known construction, and an enlargement in the form of a helical ramp is formed around the shank adjacent the head for interfering with a margin of a workpiece aperture in a manner reducing the possibility of overdriving the screw and stripping the threads from the workpiece while enhancing the clamping effectiveness of the screw. In accordance with the present invention, the anti-stripping enlargement or helical ramp extends for approximately 180 degrees around the screw shank as distinguished from about 360 degrees as disclosed in the above-mentioned patent. It has been found that this distinction results in significant improvements in screw effectiveness and manufacturing costs.

BRIEF DESCRIPTION OF THE DRAWINGS

Other objects and advantages of the present invention will become apparent from the following description and the accompanying drawings wherein:

FIG. 1 is a side elevational view, partially broken away, of a prior art screw of the type disclosed in the previously mentioned patent;

FIG. 2 is an enlarged fragmentary sectional view taken along line 2—2 in FIG. 1;

FIG. 3 is a partial sectional view, partially broken away, showing a screw incorporating features of the present invention assembled with a pair of sheet metal workpieces;

FIG. 4 is an enlarged sectional view of the screw shown in FIG. 3 taken along line 4—4 in FIG. 3;

FIG. 5 is a fragmentary view of the screw, partially broken away, as seen from line 5—5 in FIG. 4;

DETAILED DESCRIPTION OF THE PREFERRED EMBODIMENT

Figure 6:
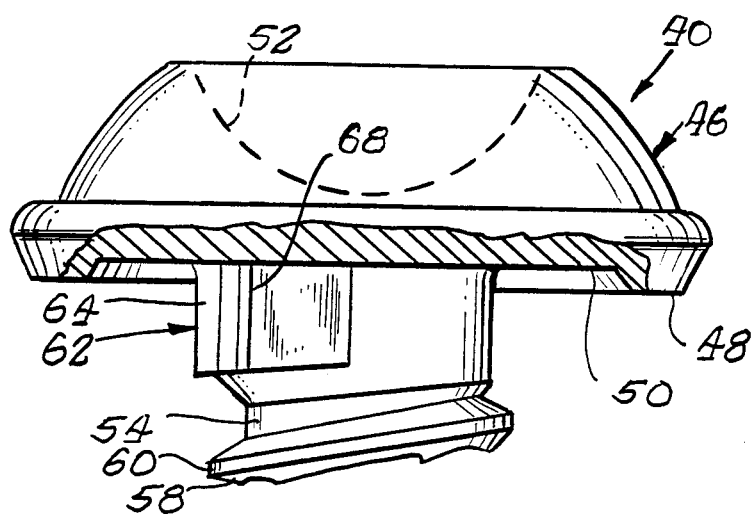
FIG. 6 is a fragmentary side view, partially broken away, of the screw as seen from line 6—6 in FIG. 4.

In FIGS. 1 and 2, there is shown a screw 10 illustrative of a prior art device such as that disclosed in the aforementioned U.S. Pat. No. 4,516,893. The screw 10 comprises a head 12 and an axially extending shank 14 adapted to extend through sheet metal workpieces or panels 16 and 18 which are to be secured together. The head presents an axially facing clamping surface 20 having a recess 22 therein surrounding the shank. The head may be formed with any conventional drive surface configurations for cooperative engagement with screwdrivers of known construction. In the embodiment shown, the head is formed with a cavity 24 adapted to receive and cooperate with a Phillips type screwdriver (not shown).

The screw shank is provided with a conventional tip such as a self-drilling tip 26 of known construction and helical threads 28. An anti-stripping enlargement in the form of a helical ramp 30 is formed around the screw shank adjacent the head. In this prior art device, the ramp extends entirely around the shank 14 for about 360 degrees as shown in FIG. 2. For a more detailed description of the ramp and its functioning as anti-stripping means, reference is made to the aforementioned patent. It suffices to state here that the ramp 30 does provide the screw with anti-stripping capabilities but, experience has shown, that manufacturing problems are encountered particularly as a result of relatively short tool life and optimum clamping pressure or effectiveness is difficult to obtain.

Referring now to FIGS. 3–6, a screw 40 is shown which incorporates features of the present invention. The screw 40 is adapted to secure sheet metal workpieces or plates 42 and 44 together when fully installed as shown in FIG. 3. The screw 40 comprises a forged head 46 presenting an axially facing under or clamping surface 48 having an annular recess 50 formed therein. The head may be formed with any known hexagonal or other external or internal driving surfaces adapted to be cooperatively engaged by known manual or power driven screwdrivers. For example, internal drive surface means 52 may be provided for mating with a standard Phillips-type screwdriver.

A screw shank 54 extends axially from the head 46. The screw shank may be provided with any suitable known entering end configuration such as a self-drilling tip 56. Helical thread convolutions 58 of known construction suitable for sheet metal use are rolled and produce the shank 54. These thread convolutions have a root diameter the same as the diameter of the finished shank 54 and crests 60 with a larger predetermined diameter.

In accordance with the present invention, the screw 40 is provided with anti-stripping means 62 on the shank at the junction between the shank and the underside of the head. The anti-stripping means 62 is in the form of an enlargement or ramp having a radially outwardly facing side surface 64 which spirals with an increasing radius from a starting point 66 substantially at the root diameter of the threads to a maximum radius at a terminal point 68 as shown best in FIG. 4. The radius of the ramp side surface 64 at the point 68 is greater than the maximum radius of the thread crests 60. Preferably, the base face 64 is formed with a plurality of ratchet teeth 70 arranged to resist retrograde rotation of the screw.

As shown in the drawings, the face 64 extends from the surface of recess 50 in the head of the screw to a junction with an axially facing end surface 71 having a helix angle similar to but slightly less than the helix angle of the thread convolutions 58 so that the anti-stripping ramp 62 intersects the uppermost thread and at the same time progressively decreases in axial extent from the point 66 to the point 68. The arrangement is such that throughout its circumferential extent, the ramp side face 64 projects substantially below the clamping face 48 of the head, for progressive engagement with the workpiece 44 when the screw is fully assembled.

As shown in FIG. 3, the workpiece or panel 42 is preferably provided with a predrilled aperture 72 having a diameter similar to or slightly greater than the diameter of the thread crests 60. At the same time, the radius of the aperture 72 is greater than the maximum radius of the ramp surface 64, particularly at the terminal point 68. The workpiece 44 may also be provided with a predrilled aperture, but in the embodiment shown, an aperture 74 is formed therein by the drill tip 56 of the screw so that it has a diameter slightly greater than that of the diameter of the screw shank 54 and the root diameter of the threads 58.

When the screw 40 is assembled with the workpieces or panels 42 and 44, it first passes through the predrilled aperture 72 and is then driven by a suitable driver, not shown, so that the tip 56 forms the aperture 74 in the workpiece 44 and the threads 8 are caused to form complementary thread elements in the margin of the workpiece 44. As the screw approaches its final position shown in FIG. 3, the spiraling peripheral or side surface 64 of the enlargement or ramp 62 progressively engages and deforms the workpiece 44 so as to obtain an increasingly aggressive interference fit. This interference fit increases the torque required to drive the screw so as to reduce any possibility of the screw being over-torqued and the threads 58 being stripped from the workpiece 44, particularly when a power screwdriver is being used. At the same time, this anti-stripping action is obtained without unduly reducing the clamping pressure which may be exerted by the clamping face 48 of the screw against the outer surface of the workpiece 42. In other words, the structure is such that the desired anti-stripping effectiveness is obtained while the optimum clamping effectiveness is also obtained.

Tests comparing the driving characteristics and effectiveness of the prior art screws and the screws of the present invention have demonstrated the superiority achieved by the invention. Statistically analyzed test data demonstrate that the screw of the present invention can be driven to a fully seated workpiece clamping condition with significantly less driving torque than the prior screw. At the same time, the data established that the new screw has statistically at least substantially as good anti-stripping characterization. Thus the spread between the required driving torque is increased so as to enable the screws to be driven more reliably.

Figure 7:
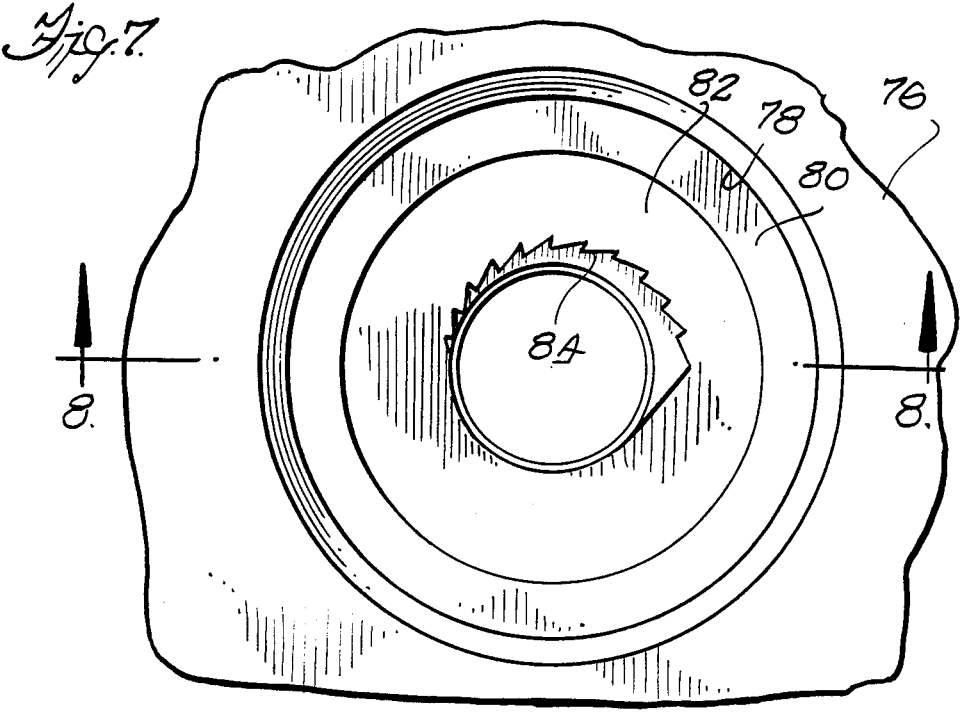
FIG. 7 is a fragmentary plan view showing a die utilized in the manufacture of screws of the present invention.
Figure 8:
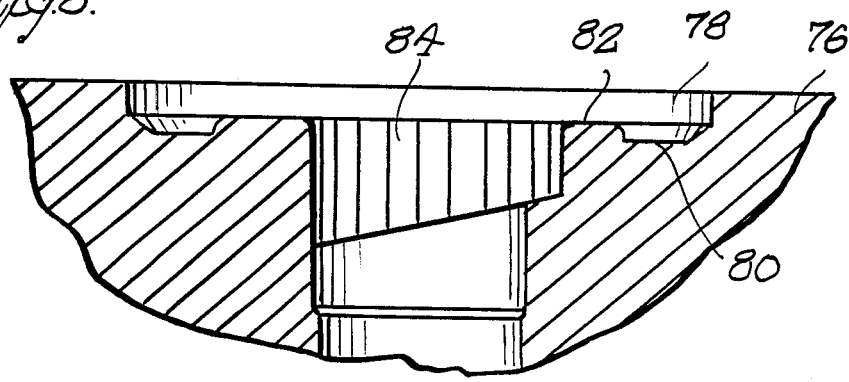
FIG. 8 is a fragmentary sectional view taken along line 8—8 in FIG. 7.

In manufacturing the screws of the present invention, a blank, not shown, is first subjected to the cold-forming action of heading dies to produce the head portion 46 and the anti-stripping enlargement 62, and thereafter the shank 54 is subjected to thread rolling dies to produce the threads 58. In addition, in the embodiment shown, the free end of the shank is milled in a known manner to provide the drilling tip. In FIGS. 7 and 8, there is shown a heading die 76 adapted to form the underside of the screw head and the enlargement 62. More specifically, the die 76 has an annular cavity portion 78 with surfaces 80 and 82 for forming the clamping face 48 and recess 50 at the underside of the screw head. A semi-circular recess 84 extends from the surface 82 for defining the spiral configuration of the anti-stripping enlargement or ramp 62. The recess 84, having only one-half the circumferential extent of the corresponding recess in dies, not shown, used to produce the prior art device of FIGS. 1 and 2, simplifies the construction and reduces the amount of cold working of the blank material in the region where the threads approach the head. As a result, it has been found that substantial and significant manufacturing advantages are obtained in increasing tool life and in improving the quality and uniformity of the screws being produced. Furthermore, the reduction in the amount of metal which is cold-worked and displaced laterally improves the concentricity between the drilling tip and the drive surfaces on the head. This results in improved drilling action which reduces the required drilling times.

While a preferred embodiment of the present invention has been shown and described herein, it is contemplated that changes can be made without departing from the spirit and scope of the appended claims.

The invention is claimed as follows:

1. A rotary fastener for securing an apertured workpiece of predetermined thickness to a second workpiece comprising a head portion having a clamping surface, a shank extending axially from said clamping surface, helical thread convolutions having predetermined root and crest diameters on said shank, and an anti-stripping enlargement on said shank adjacent said head, said enlargement including a side face extending circumferentially of said shank about 180 degrees, said side face having a radius adjacent a starting point thereof less than one-half of said crest diameter of said thread convolutions and a radius adjacent a terminal point thereof greater than one-half of said crest diameter for engaging an inner margin of the apertured workpiece for increasing stripping torque and enhancing clamping effectiveness when the fastener is applied to said workpieces, said head portion including a recess formed on an underside thereof, said side face extending axially beyond said recess at said starting point and at said terminal point.

2. A fastener, as defined in claim 1, wherein said axial extent of said side face is greater than said predetermined thickness of the apertured workpiece.

3. A fastener, as defined in claim 2, wherein said enlargement includes a helical axially facing end merging with an adjacent helical thread convolution.

4. A fastener, as defined in claim 1, wherein said side face includes a series of ratchet teeth disposed for resisting retrograde rotation of the fastener.

5. A screw fastener for securing a first workpiece of predetermined thickness to a second workpiece comprising a head portion including driver engageable surface means thereon and an axially facing clamping surface, a shank extending axially from said head portion beyond said clamping surface, said head portion having an annular recess in said clamping surface surrounding said shank, said shank including drill tip means at a free end thereof, a plurality of helical thread convolutions on said shank having predetermined root and crest diameters, and an anti-stripping ramp on said shank between said head and said thread convolutions, said ramp including a side face having a progressively increasing radius from a starting point to a terminal point thereof, said radius adjacent said starting point being similar to one-half of said root diameter of the thread convolutions, and said radius adjacent said terminal point being in excess of one-half of said crest diameter of the thread convolutions for causing said side face to engage said second workpiece for increasing stripping torque when the fastener is applied to said workpieces, said side face extending for about 180 degrees around said screw shank from said starting point to said terminal point, and said side face extending axially outwardly of the recess in the head portion clamping surface throughout the entire circumferential extent of said side face.

* * * * *